Dec. 9, 1947.  E. HUNTER  2,432,423
PURIFICATION AND COMPRESSION OF ETHYLENE
Filed Oct. 4, 1943

INVENTOR.
Edward Hunter
BY
ATTORNEY

Patented Dec. 9, 1947

2,432,423

UNITED STATES PATENT OFFICE 2,432,423

PURIFICATION AND COMPRESSION OF ETHYLENE

Edward Hunter, Northwich, England, assignor to Imperial Chemical Industries Limited, a corporation of Great Britain Application October 4, 1943, Serial No. 504,956
In Great Britain October 26, 1942

1 Claim. (Cl. 260—677)

This invention relates to a new process for the purification and compression of ethylene, in particular for the separation of ethylene at an elevated pressure from other gases.

Many processes are known for isolating an ethylene-rich gas from hydrocarbon and other gaseous mixtures containing small or large proportions of ethylene, and ethylene-rich gases so obtained may contain 30-95% of ethylene. It is frequently necessary to purify this ethylene-rich gas before it can be employed in further commercial processes, because some of these processes require ethylene of a high degree of purity. This can be done to some extent by liquefying the ethylene at an elevated pressure and a temperature below 10° C., but such a process requires low temperature cooling and does not give a particularly pure product because other gases are soluble in liquid ethylene.

One object of the present invention is to provide a new and improved process for the recovery of an ethylene-rich gas from gases of intermediate or low ethylene content. Another object is to provide a process for the purification of gases containing a major proportion of ethylene. A further object is to separate ethylene from hydrocarbon and other gases. Yet another object is to provide a process for the thermal compression of ethylene.

It is known that ethylene and water form a solid hydrate, probably hexahydrate, which can exist below 19° C. at an elevated pressure; the dissociation pressure of this solid hydrate ranges from about 6 atmospheres at 0° C. to about 60 atmospheres at 17° C. We have now found that at sufficiently high pressures this hydrate is capable of existing at higher temperatures than hitherto thought, even up to 60° C. and we have devised a method of using the formation and decomposition of this hydrate to give a new and improved process for the purification and/or compression of ethylene.

According to the present invention we contact ethylene or a gas containing it, with an aqueous medium preferably at a temperature between −5° and 60° C. and at such super-atmospheric pressure that at least part of the ethylene is converted into solid ethylene hydrate, and if desired separate the residual gas and/or liquid rich in impurities, and thereafter raise the temperature and/or lower the pressure sufficiently to liberate ethylene from the ethylene hydrate.

By blowing off the residual gas or liquid, part or all of the impurities may be removed from the system and purified ethylene is obtained by the subsequent decomposition of solid ethylene hydrate. By raising the temperature of the hydrate the ethylene is liberated at a pressure exceeding the pressure at which the hydrate is initially formed. The temperature of the gas may initially be reduced to the initial temperature if desired without dropping the pressure, by cooling the gas and allowing its volume to contract at constant pressure.

At the operating pressure during the absorption of ethylene and the formation of solid ethylene hydrate, the partial pressure of ethylene must exceed the dissociation pressure of ethylene hydrate at the temperature employed. By dissociation pressure is meant the equilibrium pressure which is generated when ethylene hydrate coexists with its saturated aqueous solution and a vapour at the temperature employed. During the subsequent decomposition of ethylene hydrate and evolution of ethylene, either the temperature must be raised above the decomposition temperature of ethylene hydrate at the pressure at which ethylene is allowed to evolve, or the pressure must be lowered below the decomposition pressure of ethylene hydrate at the temperature of the hydrate. This decomposition is somewhat analogous to melting, but cannot properly be described as such because the solid does not melt into a liquid of the same composition but changes into a solution and a vapour both of which are of different compositions from that of the solid. The dissociation pressure of ethylene hydrate at equilibrium is approximately 6 atmospheres at 0° C., 20 atmospheres at 10° C., and 70 atmospheres at 20° C.; rising to about 450 atmospheres at 40° C. and about 1000 atmospheres at 60° C.

By partial pressure of ethylene in a gas mixture is meant the algebraic product of the total gas pressure and the mole fraction of ethylene in the gas mixture. The above dissociation pressures represent the minimum ethylene partial pressures required at these temperatures to cause the formation of ethylene hydrate. Naturally, the lower the mole fraction of ethylene in the gas the higher will be the minimum total gas pressure for the formation of the hydrate.

In order to absorb the ethylene at reasonable pressures, we prefer to use temperatures as low as can conveniently be obtained. Thus, at 20° C. it is sufficient to compress the incoming gas so that the partial pressure of ethylene in that gas exceeds 70 atmospheres; whereas at 40° C. and 60° C. ethylene partial pressures exceeding 450 atmospheres and 1000 atmospheres respectively are required. At the same time, it is not always convenient to work below atmospheric temperatures and therefore we prefer to operate at 10°–30° C.

Any ethylene partial pressures applied in excess of the above equilibrium figures provide driving force for the ethylene to be converted into solid ethylene hydrate. Thus, although we may use any total pressure at which the partial pressure of ethylene in the incoming gas exceeds the dissociation pressure of solid ethylene hydrate at the temperature employed, we prefer to use considerably higher partial pressures in order to decrease the time required for the formation of hydrate. Furthermore, when using the process as a means of purifying crude ethylene, total pressures much greater than the dissociation pressures permit the purging of a gas of comparatively low ethylene mole fraction; thus a larger proportion of the crude ethylene can be recovered in the refined condition. Nevertheless, with total pressures much greater than the dissociation pressures, any residual liquid phase may contain appreciable quantities of one or more of the impurities introduced with the ethylene, and the production of a specially pure ethylene may require either the conversion of all the water present to ethylene hydrate or the displacement or removal of the residual liquid phase as well as the gas phase before recovering the refined ethylene from its hydrate.

The times required for the formation and decomposition of ethylene hydrate are not critical and depend inter alia on the temperature, the ethylene partial pressure, the difference between equilibrium dissociation pressure and actual ethylene partial pressure, the presence of seed crystals, the degree of agitation and the area of interface between gas and liquid. Broadly speaking, the volume of crystallisation vessel required is 10–50 litres per kilogram of ethylene crystallised in each batch, and the time required per batch may be ½–20 hours, depending on all the above factors.

After blowing off or displacing the gaseous fraction rich in impurities, even a slight rise of temperature or lowering of the pressure into the region where the solid hydrate is unstable liberates the ethylene as a purified gas, and all the ethylene hydrate is dissociated if these temperature and pressure conditions are maintained. Thus, when arranging the apparatus for the liberation of gas at 250 atmospheres, we raise the temperature above 31° C., this being the decomposition temperature of ethylene hydrate at that pressure, and the ethylene hydrate gradually decomposes into a solution of ethylene in water and an ethylene-rich gas. Alternatively, if we are maintaining the hydrate at a fixed temperature of 31° C. we lower the pressure below 250 atmospheres. The proportion of ethylene which appears in the gas is generally much larger than the proportion which remains in solution in the water, because the solubility of ethylene in water is low—e. g., less than 2% by weight and generally less than 1%. In order to accomplish this decomposition rapidly, we prefer to raise the temperature substantially above the decomposition temperature of the hydrate, e. g., 10–20° C. above, or to lower the pressure substantially below the dissociation pressure of the hydrate, e. g., to about three quarters of it.

During the absorption of ethylene in the water and the crystallisation of ethylene hydrate, heat is liberated. When starting with cold water and operating with a high pressure such as 1000 atmospheres, an appreciable weight of ethylene can be converted into hydrate without the need for cooling during this part of the process, especially if the apparatus is of large heat capacity. Nevertheless, it is preferable, whatever the temperature and pressure conditions, to cool the reaction mixture during the absorption of ethylene. The heat which is liberated during the absorption of ethylene must also be returned during the evolution of the purified ethylene. Although this evolution may be brought about by merely lowering the pressure sufficiently in which case the heat is obtained from cooling of the reaction mixture, I prefer to apply heat during the evolution as this gives more rapid evolution of the ethylene and avoids serious pressure drop in the whole process.

One method of effecting this heat change during the absorption and subsequent liberation of ethylene is by maintaining thermal contact of these two stages of the process. In this way the heat which must be imparted to the ethylene hydrate during decomposition is supplied through the walls of a heat interchanger from the heat which is liberated during the absorption of ethylene from a fresh supply of incoming gas. As these quantities of heat are of equal magnitude, this provides a process for the purification of ethylene in which little external heating or cooling is involved. Owing to the temperature drop across the heat interchange surface, the temperature, and therefore the pressure, at which the purified ethylene is evolved are lower than those of the incoming gas. One suitable apparatus in which this form of the process can be carried out consists of one closed pressure vessel placed inside another closed pressure vessel thermally insulated on the outside, both vessels being equipped for agitation of the liquids inside them or for bubbling the gas through the liquid, and having their respective gas connections. One of these vessels is used for absorbing ethylene and the other is used for decomposing ethylene hydrate. Another suitable apparatus consists of two or more pressure vessels with suitable connections and agitation arrangements, situated in a common heat exchange medium through which the heat passes from the absorbers to the decomposers. In both these types of apparatus we reverse the functions of the vessels when the reaction is complete. A third suitable apparatus is a single vessel of large heat capacity; in such an apparatus the heat liberated during the absorption of ethylene causes only a small rise of temperature, and the apparatus acts as a heat accumulator from which the same heat is recovered during the decomposition of the ethylene with only a small overall drop in temperature, and therefore only a small drop in pressure of the ethylene.

A more detailed understanding of the apparatus will be obtained from the accompanying drawings which are cross-sectional, diagrammatic views of suitable apparatus.

In Figure 1 a pressure resisting receptacle is provided with water inlet, crude ethylene inlet, pure ethylene outlet, release valve, agitator, pressure gauge, and cooling or heating coil. The apparatus is first filled with water, crude ethylene bubbled in and the unabsorbed gases exhausted through the release valve. When a suitable amount of the hydrate of ethylene has formed, the release valve is closed, the contents of the vessel heated by means of the heating coil and the relatively pure ethylene discharged.

Figure 1:
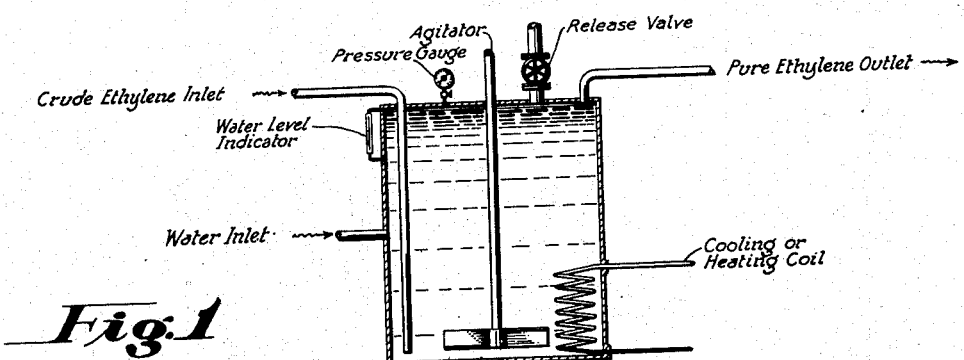
Figure 2:
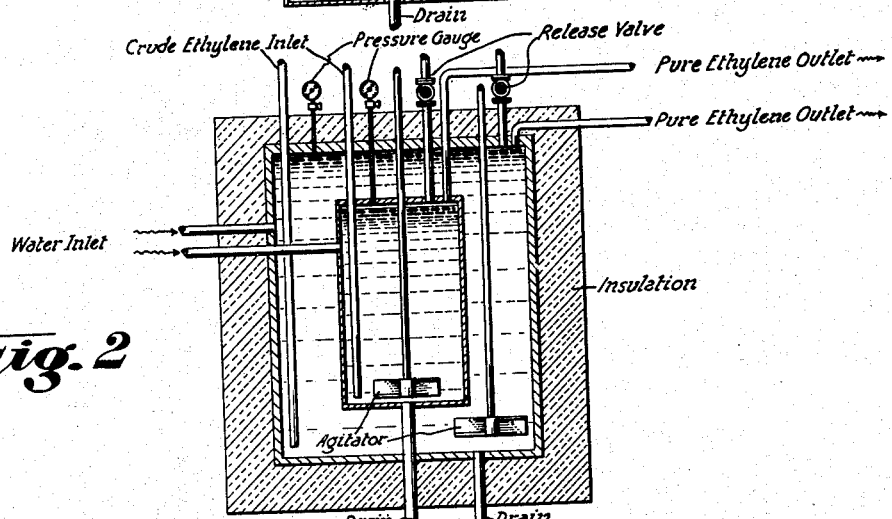
Figure 2 illustrates a nest of similar receptacles suitably insulated, whereby the exothermic heat formed by crystallization in one receptacle is utilized to heat the hydrate in the other above the hydrate's dissociation temperature. By this means no external heat is required to conduct the process.
Figure 3:
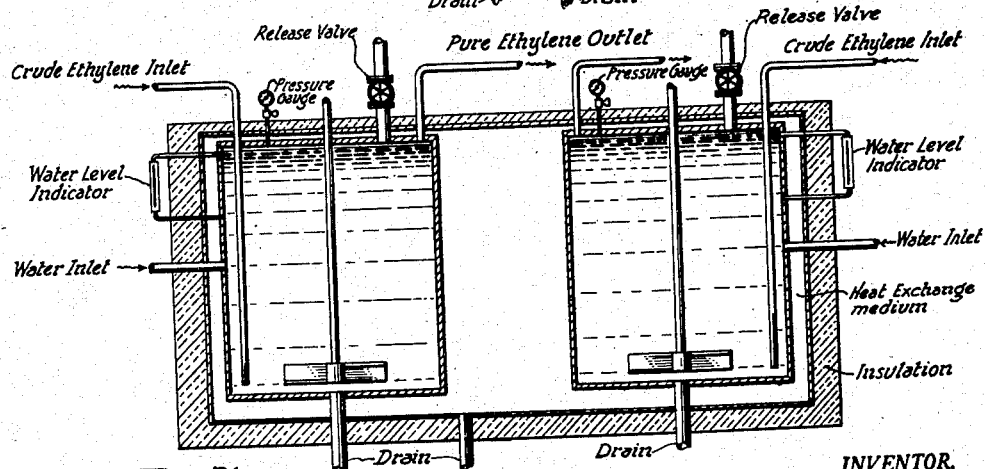
Figure 3 illustrates an apparatus wherein a heat balance is maintained similar to that obtained by the apparatus of Figure 2. In this instance, however, a heat exchange medium is provided to transfer the heat between the vessels in which crystallization and dissociation occurs.

This invention also provides a new type of heat compressor for ethylene which may be illustrated as follows. Starting with ethylene at a partial pressure of 70 atmospheres and 20° C., we pass it into water, which is kept below 20° C. by external cooling, until a substantial amount of ethylene hydrate is formed. We then raise the temperature of the ethylene hydrate to 60° C. with the vessel closed, and while maintaining this temperature by applying heat we allow the hydrate to decompose and liberate the ethylene at a pressure of nearly 1000 atmospheres. The ethylene at a pressure of 1000 atmospheres is also at a higher temperature than initially. Cooling the ethylene at constant volume reduces somewhat the net amount of compression effected by the process; alternately, the ethylene may be cooled at constant pressure as it issues. This heat compressor can also be operated at lower or higher pressures and temperatures, provided that the temperature of decomposition of the hydrate is higher than the temperature of formation.

The purification of ethylene may be illustrated by the following description. When any gas is compressed in the presence of water the gas dissolves up to an amount proportional to the partial pressure of that gas. In the particular case of ethylene, the concentration of ethylene in solution at a given temperature below 60° C. is limited by the formation of solid ethylene hydrate when the pressure is sufficient; on the admission of further ethylene the equilibrium pressure does not rise because the ethylene is converted into solid ethylene hydrate, and the solution has only a low ethylene content. In practice, the actual partial pressure exceeds the equilibrium pressure by an amount representing the difference between the rate of input of ethylene and the rate of crystallisation of hydrate. The compression of ethylene in the presence of water which is kept cold gives at first a rise of pressure while the water phase is being enriched with ethylene, and then a fairly steady pressure despite further compression, while ethylene hydrate is being deposited and the composition of the solution is remaining unchanged. For example, if we compress a gaseous mixture containing ethylene and nitrogen in the presence of water at a fixed temperature, these two gases at first dissolve in quantities which correspond with their partial pressures. As the total pressure of gas is increased the concentration of ethylene in the water reaches its maximum figure at that temperature and a further increase of total pressure does not increase the ethylene partial pressure. Thus, the amount of ethylene extracted from the incoming gas is increased disproportionately to the amount which would dissolve if there were no separation of ethylene hydrate, and the gaseous mixture above the liquid becomes rich in nitrogen. A sufficiently pure ethylene may usually be obtained by blowing-off or otherwise displacing the gas mixture rich in nitrogen from the top of the vessel and subsequently raising the temperature or lowering the pressure of the liquid plus solid phase sufficiently to effect dissociation of the solid phase and thereby liberate purified ethylene. This effects a large measure of purification, but the ethylene obtained is still slightly contaminated with nitrogen due to the small quantity of nitrogen dissolved in the liquid phase present. An even more complete purification may be effected by not only purging the nitrogen-rich gaseous phase, but also either removing the liquid phase leaving pure ethylene hydrate from which pure ethylene is recovered, or utilising so much incoming gas that substantially all the water originally present is converted to solid ethylene hydrate.

It is convenient to observe the progress of the purification by the composition of the gas mixture above the liquid. When solid hydrate starts to form, the ethylene content of the supernatant gas falls below that of the incoming gas. A further method is by observing the rate of cooling required to prevent the temperature of the liquid from rising, because crystallisation of the hydrate is accompanied by evolution of heat.

The invention may be employed for the separation of a purified ethylene from gases containing ethylene and one or more of the following gases: other hydrocarbons, hydrogen, nitrogen, oxygen, carbon monoxide, carbon dioxide, and all other gases with which ethylene is normally contaminated. The separation from most of these gases is virtually complete, but it is incomplete from those gases which also form solid hydrates within this temperature range, when large amounts of such gases are present in the incoming gas; such gases are principally acetylene, carbon dioxide and methane. The process has the advantage that the purified ethylene may be recovered at substantially the same pressure as the incoming crude ethylene, or even higher.

The invention may conveniently be operated as a batch process, in which each reaction vessel may be used first as an absorber and crystalliser, and later as a decomposer. It may also be operated as a semi-continuous process in which a series of such vessels worked batchwise are coupled up alternately to provide in effect a continuous purification and/or compression of ethylene. It may also be operated by continuous absorption of ethylene and crystallisation of the hydrate, in a vessel to which water and compressed ethylene are fed continuously, with batch or continuous transfer of the hydrate therefrom to a continuous decomposer.

The invention is illustrated but not restricted by the following examples.

*Example 1*

The reaction vessel employed in this example is a stirred pressure vessel fitted with a release valve set to operate at 100 atmospheres. The vessel contains 400 parts of water by weight, and there is a small gas space above the surface of the water; the incoming gas contains 90% by volume of ethylene and 10% by volume of other hydrocarbons, and it is compressed into the reaction vessel. The first amounts of gas to be compressed into the pressure vessel partly dissolve and the pressure rises rapidly to 80 atmospheres and then to 100 atmospheres. Thereafter there is a continuous purge of impure gas through the release valve. This impure gas contains 75% by volume of ethylene, the remainder being the other hydrocarbons introduced with the impure gas. 90 parts by weight of the incoming gas are compressed into the reaction vessel, which is kept at 20° C. by cooling with water in order to remove the latent heat of crystallisation of the ethylene hydrate. After stopping the supply of incoming gas the release valve is opened further to allow the pressure in the vessel to fall quickly to 70 atmospheres. The gas released in this way contains nearly all the impurities remaining in the reaction vessel. The release valve is then partly closed and the temperature of the reaction vessel raised to 30–40° C.; and 50 parts by weight of gas are thereby evolved at 300 atmospheres pressure. This gas contains 98–99% by volume of ethylene.

Example 2

A cooled agitated pressure vessel with connections at the upper and lower ends, is half filled with cold water. A compressed gas containing 70 volume % of ethylene and 30% volume nitrogen is bubbled into the water. When the pressure has risen to 500 atmospheres the gas feed is stopped and cold water is pumped in to displace the residual gas in the vessel which is removed from the top. The liquid is then drained off from the bottom of the vessel, and the solid remaining in the vessel is heated to generate ethylene.

Example 3

A gas containing 99 volume % ethylene, 1 volume % hydrogen, is compressed and bubbled into water which is maintained at 30° C. in a pressure vessel. The pressure in the vessel rises to 350 atmospheres and at that pressure impure gas is allowed to escape from the top of the vessel while the solid hydrate forms in the vessel. The vessel is then warmed to 40° C. and purified ethylene containing 99.7% ethylene is evolved at 350 atmospheres pressure.

The invention may be employed for purifying crude or fairly pure ethylene and for separating ethylene from an ethylene-rich gas. The former gas will generally contain over 90% of ethylene by volume, but the latter may contain even as little as 10% of ethylene by volume although we generally prefer to use gases containing at least 60% of ethylene.

What I claim is:

In a process of separating ethylene of higher purity from a gaseous mixture containing from 10 to 95% ethylene, the remainder being other gases which contaminate ethylene and which are non-hydratable or more difficultly hydratable than ethylene, the steps which comprise charging a vessel with water leaving a small vapor space above the water, bubbling the gaseous mixture containing 10 to 95% ethylene into the water under conditions at which ethylene hydrate forms, while discharging the unabsorbed gases through the vapor space from the vessel, after the formation of ethylene hydrate adding more water to the vessel to fill the vapor space, thereby discharging the unabsorbed gases from the vessel and thereafter recovering the ethylene by subjecting the ethylene hydrate to conditions that dissociate it.

EDWARD HUNTER.

REFERENCES CITED

The following references are of record in the file of this patent:

UNITED STATES PATENTS

| Number | Name | Date |
| --- | --- | --- |
| 2,271,214 | Welty Jr. | Jan. 27, 1942 |
| 2,270,016 | Benesh | Jan. 13, 1942 |
| 2,363,529 | Hutchinson | Nov. 28, 1944 |
| 2,356,407 | Hutchinson | Aug. 22, 1944 |
| 2,263,363 | Menshih | Nov. 18, 1941 |
| 2,375,559 | Hutchinson et al. | May 8, 1945 |
| 2,375,560 | Hutchinson et al. | May 8, 1945 |
| 2,399,723 | Crowther | May 7, 1946 |

OTHER REFERENCES

Hammerschmidt, Jour. Ind. Eng. Chem., vol. 26, 851–5 (1934) P. O. L.

Villard, Annales de Chemie et de Physique Ser. 7, vol. 11, 368–371 (1897), 260–676.

Deaton et al., American Gas Jour., June 1937, 17–21 and 32. (Photostat in 260–676.)

Deaton et al., "Gas," June 1940, 28–30. (Photostat in 260–676.)